Patented Mar. 1, 1932

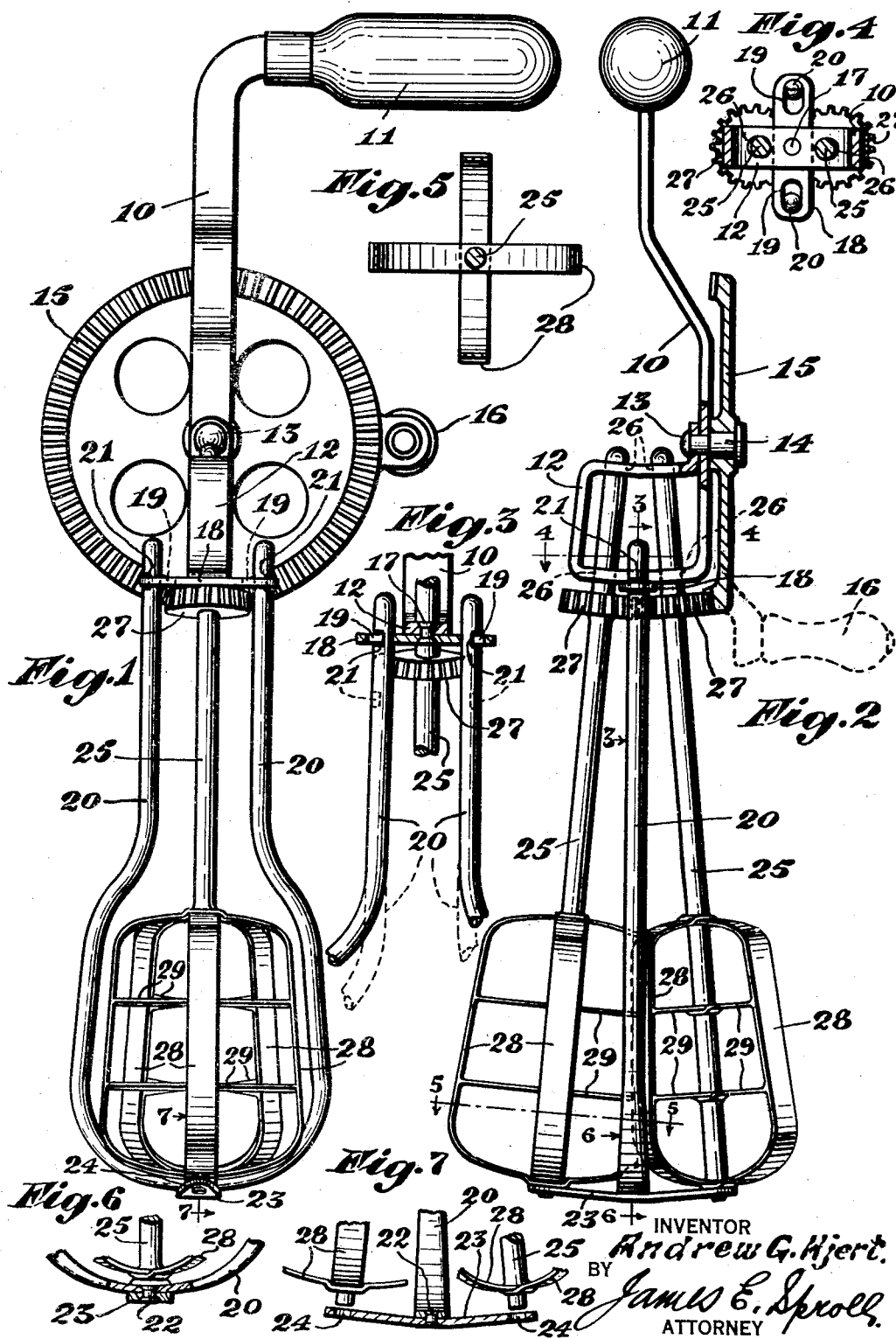

1,847,563

UNITED STATES PATENT OFFICE

ANDREW G. HJERT, OF SEATTLE, WASHINGTON

EGG BEATER

Application filed October 12, 1929. Serial No. 399,139.

This invention relates to novel improvements in egg beaters or the like and aims primarily to provide a sanitary separable egg beater, especially designed to be easily and rapidly taken apart, whereby the beating or whipping members thereof and related parts are rendered readily accessible for thorough cleaning and proper drying prior to reassembly of same.

Contemplated by the present invention is the provision of a separable egg beater embodying a sectional frame capable of being readily dismantled, beater members journalled for rotative movement within said sectional frame, and means for rotating said beating members, all of which are important features of the invention and are to be correlated in the broad aim of enhancing the efficiency of the device for general use.

The above, and additional objects which will hereinafter be more specifically treated are attained by such means as are shown in the accompanying drawings, described in the following specification and then more clearly pointed out in the claims, which are appended hereto and form part of this application.

With reference to the drawings, in which there is illustrated one embodiment of the invention, and throughout the several views of which like characters of reference designate similar parts:

Figure 1 is a front elevation of an egg beater comprehended by the present invention.

Fig. 2 is a side elevation of the same, certain parts being broken away and certain others being shown in section for clarity of illustration.

Fig. 3 is a fragmentary vertical section taken through line 3—3 of Fig. 2.

Figs. 4 and 5 are horizontal sections taken through lines 4—4 and 5—5, respectively, of Fig. 2.

Fig. 6 is a fragmentary vertical section taken through line 6—6 of Fig. 2 and

Fig. 7 is a similar section taken through line 7—7 of Fig. 1, with the parts illustrated in separated relation.

Before taking up the detailed description of the drawings, a general exposition of the specific purposes, features and advantages of the egg beater evolved by the present invention will be undertaken.

Heretofore, various objections to the egg beaters in general use have been noted principally among which are: their mode of construction effectually prevents their being taken apart for cleaning; great difficulty is experienced in properly cleansing and drying the same; their manner of construction effectually precludes repairs thereto, or the interchanging the several parts thereof; and in many instances, due to friction between parts, considerable effort must be exerted to operate same.

It is therefore, the principal aim and purpose of this invention to overcome and obviate these objections, by the provision of a sanitary separable egg beater: which is especially designed and particularly adaptable for rapid dismantling so that the several parts thereof are readily accessible for proper cleansing and drying and for quick reassembly thereafter; which is capable of being rapidly and quickly repaired; which is constructed to permit ready interchanging or replacing of parts; and which is fabricated in a novel manner to substantially reduce friction between the several operating parts thereof.

Beginning now the more detailed description of the invention by reference to the drawings, the numeral 10 designates the upper section of a sectional egg beater frame, preferably fabricated from a metallic bar or strip, the upper end portion of which is bent edgewise at right angles and provided thereat with a handle 11, while its lower end portion is return bent flatwise to form a quadrangular loop 12, with the terminal of said portion fixedly secured to the central portion of the bar 10, as by a rivet 13, to thereby provide rigidity for the loop 12.

Rotatively mounted upon an outwardly projecting shouldered extension 14 of the rivet 13 is a bevel gear 15 adapted to be manually rotated by a crank or operating handle 16 riveted or otherwise rigidly secured to the periphery thereof.

Fixedly and medially secured, as by a rivet 17, to the underside of the loop 12 in transversely disposed relation thereto is a bar 18 provided adjacent its ends with slots 19 adapted to receive and wherethrough the free upper terminal portions of a resiliently elongated U-shaped member 20 normally extend, which member forms and constitutes the lower section of the sectional egg beater frame, and in the present instance is preferably fabricated from wire or analogous material of suitable gauge. The upper and lower sections 10 and 20, respectively, of the egg beater frame are adapted to be detachably connected or interlocked, and for this purpose the outer sides of the free upper terminal portions of the member 20 are provided with notches 21, which normally receive and restrainingly engage the outer ends of the slots 19, substantially in the manner illustrated in Figs. 1 and 4.

Rigidly and medially secured, as by a rivet 22, to the underside of the arcuate lower end of the U-shaped member 20 in transversely disposed relation thereto is a bar 23, that portion of the member 20 adjacent the point of attachment of the bar 23 thereto being preferably flattened, as shown more clearly in Figs. 6 and 7, in order to furnish a suitable attaching surface for said bar, as will be manifest and apparent.

Formed within the bar 23 adjacent the ends thereof are bearings 24, within which are rotatively mounted the lower ends of beater member shafts 25, said shafts having their upper end portions similarly mounted in spaced axially aligned guide bearings 26 formed in the horizontally disposed portions of the quadrangular loop 12. By thus mounting the upper end portions of the shafts 25 within the spaced bearings of the quadrangular loop 12, in the manner herein shown and described, such bearings serve and function to effectually prevent wobbling of the shafts during rotation thereof.

Rigidly secured to the shafts 25, at points thereon below the section 10, are pinions 27, which are normally in mesh, one of said pinions being in normal meshed relation with the bevel gear 15, all as clearly shown in Fig. 2, whereby rotative movement of the bevel gear 15 is imparted to said shafts 25, in opposite directions, as will be evident and apparent.

The numeral 28 designates beater members, preferably fabricated from relatively thin metallic strips, which are bent or fashioned to form rigid frame-like structures, and are rigidly secured in cross-wise relation upon the lower portion of each of the shafts 25. To increase the agitative effect of the beater members 28, I have found it expedient in practice to provide the same at intervals throughout their length with thin metallic strips 29, which are fixedly secured at their ends to the sides of their correlated beater members, the strips of one beater member being disposed in crosswise relation to the strips of its complemental beater member, substantially in the manner shown, at the lower right hand side of Fig. 2.

In Fig. 1 I have illustrated the lower half portion of the legs of the elongated U-shaped member 20, as being outwardly offset or bulged, this for the purpose of providing ample clearance for the rotative beater members 28.

By referring to the drawings, it will be evident, that when the device is in use the bar 23, which is rigidly attached to the U-shaped member or lower frame section 20, rests upon the supporting surface, and any downward pressure exerted upon the handle 11 will be imparted through the upper section 10, its complemental lower section 20, and bar 23 to said supporting surface, so that the shafts 25 are in nowise affected by such downward pressure but have free rotative movement within their bearings at all times.

In the operation of the device, the beater members 28 are placed in the substance to be treated, whereupon the operator imparts rotation to the bevel gear 15 through the crank handle 16, to thereby impart reverse rotative movement to the pinions 27, which in turn impart similar movements to their correlated and interconnected beater members 28, to thus effect beating or whipping of said substance.

To cleanse the device after use, the operator exerts an inward pressure upon the upper portion of the U-shaped member 20, to release the notches 21 from engagement with the ends of the slots 19, substantially as shown in Fig. 3, whereupon the upper ends of said member are withdrawn from said slots, as indicated in dotted lines in said Figure, which latter movement simultaneously effects unseating of the lower ends of the shafts 25 from their bearings 24, as illustrated in Fig. 7, following which the upper portions of the shafts 25 are withdrawn from their bearings 26. When the device has been thus dismantled, the several parts thereof are all readily accessible for proper and thorough cleansing and drying, and upon completion thereof are reassembled by reversing the steps above described.

It is to be here understood, that while the device of the present invention, in its present form, has been described as an egg beater, said device may be employed for other uses and purposes, such as whipping cream, mayonnaise dressing, milk shakes, malted milk drinks, and other substances requiring a like beating or whipping action. It is also to be understood, that while the device has herein been shown and described as manually operated, the same is readily adaptable and suitable for power operation.

Manifestly, therefore, the device of the present invention is extremely simple, compact, durable and economical in construction, is efficient and reliable in use, is conveniently and easily operated, is readily taken apart and reassembled, and will not readily get out of order.

While I have herein shown and described the invention with sufficient detail to enable those skilled in the art to which it pertains to understand the mode of construction and the principles involved, it is to be understood, that there is no intentional limitation herein to the specific form and precise details of construction shown and described, except as expressly defined by the appended claims, and that various modifications of the same may be resorted to without departing from the spirit of the invention or the benefits derivable therefrom. It is also to be understood that certain features of the invention herein disclosed may be employed in and with other combinations than those shown and described.

What I claim as my invention and desire to secure by Letters Patent is:—

1. In an egg beater or the like, the combination of a separable sectional frame including normally interlocked sections, detachable beater members having their ends rotatively mounted in different sections of said frame, and means for rotating said beater members.

2. In an egg beater or the like, the combination of a separable sectional frame including an upper section and a lower section, means for normally interlocking said sections, beater members rotatively mounted at their upper ends within said upper section and similarly mounted at their lower ends within said lower section, and means for rotating said beater members.

3. In an egg beater or the like, the combination of a separable sectional frame including a rigid upper section and a resilient lower section adapted to be normally and yieldingly held within said rigid upper section, separately removable beater members rotatively mounted within said frame and means for rotating said beater members.

4. In an egg beater or the like, the combination of a separable sectional frame including a rigid upper section and a resilient U-shaped lower section having its free ends yieldingly held within said rigid upper section, separately removable beater members rotatively mounted within said frame and means for rotating said beater members.

5. In an egg beater or the like, the combination of a separable sectional frame including a rigid upper section and a resilient elongated U-shaped lower section having its free ends restrainingly engaged within the rigid upper section, said upper section having a looped lower terminal, shafts journalled at one end within said terminal and at their opposite ends journalled within said U-shaped section, beater members on said shafts, and means to reversely rotate said shafts.

6. In an egg beater or the like, the combination of a separable sectional frame including a rigid upper section and a resilient elongated U-shaped lower section having its free ends restrainingly engaged within the rigid upper section, said upper section having a handle on one end and a quadrangular loop at its opposite end, shafts journalled at one end within said quadrangular loop and at their opposite end within said U-shaped section, beater members rigidly secured to the lower end portions of said shafts in crosswise relation, and means to reversely rotate said shafts.

In testimony whereof I affix my signature.

ANDREW G. HJERT.